(12) United States Patent
Shibuki

(10) Patent No.: US 8,545,644 B2
(45) Date of Patent: Oct. 1, 2013

(54) METHOD FOR PRODUCING A VACUUM-INSULATED DOUBLE CONTAINER

(75) Inventor: Shuichi Shibuki, Tsubame (JP)

(73) Assignee: Seven—seven Co., Ltd., Niigata (JP)

( * ) Notice: Subject to any disclaimer, the term of this patent is extended or adjusted under 35 U.S.C. 154(b) by 271 days.

(21) Appl. No.: 13/049,314

(22) Filed: Mar. 16, 2011

(65) Prior Publication Data

US 2011/0162761 A1 Jul. 7, 2011

(51) Int. Cl.
*C22F 1/18* (2006.01)
*B65D 6/10* (2006.01)
*B65D 8/04* (2006.01)

(52) U.S. Cl.
USPC .. 148/527; 148/669; 220/592.17; 220/592.27

(58) Field of Classification Search
None
See application file for complete search history.

(56) References Cited

U.S. PATENT DOCUMENTS 4,876,780 A * 10/1989 Stahl et al. .................. 138/177
4,997,124 A * 3/1991 Kitabatake et al. ........... 228/184

FOREIGN PATENT DOCUMENTS

JP 2003-129291 A 5/2003
JP 3581639 B2 10/2004

* cited by examiner

*Primary Examiner* — George Wyszomierski
(74) *Attorney, Agent, or Firm* — Sughrue Mion, PLLC

(57) ABSTRACT

The present invention is aimed at providing a method for producing a vacuum-insulated double container that exhibits a remarkable and heretofore unobtainable operating effect. The invention provides a method for producing a vacuum-insulated double container by placing a titanium internal cylinder (2) into a titanium external cylinder (1) via a space section (S), and using the space section (S) between the external cylinder (1) and the internal cylinder (2) as a vacuum-insulating space section, the method comprising the steps of degassing the space section (S) of a workpiece (3) that includes the external cylinder (1) and the internal cylinder (2), and vacuum sealing a degassing hole while the workpiece (3) is heated in a vacuum heating furnace (6); and then providing concavoconvex portions (4, 5) to a surface of the recrystallized external cylinder (1) and the internal cylinder (2) by placing the workpiece (3) in an atmospheric-pressure environment.

5 Claims, 4 Drawing Sheets

METHOD FOR PRODUCING A VACUUM-INSULATED DOUBLE CONTAINER

BACKGROUND OF THE INVENTION

1. Field of the Invention

The present invention relates to a method for producing a vacuum-insulated double container.

2. Description of the Related Art

It has been proposed to use various materials such as glass and metal for containers used to pour beverages such as beer. The present applicant has previously proposed a titanium vacuum-insulated double container as disclosed in Japanese Laid-Open Patent Application No. 2003-129291.

SUMMARY OF THE INVENTION

As a result of conducting further research and development regarding titanium vacuum-insulated double containers, the applicant has developed a breakthrough method for producing a vacuum-insulated double container having an extremely high commercial value.

A summary of the present invention will be described with reference to the accompanying drawings.

The first aspect relates to a method for producing a vacuum-insulated double container by placing a titanium internal cylinder 2 into a titanium external cylinder 1 via a space section S, and using the space section S between the external cylinder 1 and the internal cylinder 2 as a vacuum-insulating space section, the method comprising the steps of: degassing the space section S of a workpiece 3 that includes the external cylinder 1 and the internal cylinder 2, and vacuum sealing a degassing hole while the workpiece 3 is heated in a vacuum heating furnace 6; and then providing concavoconvex portions 4, to a surface of the recrystallized external cylinder 1 and internal cylinder 2 by placing the workpiece 3 in an atmospheric-pressure environment.

The second aspect relates to the method for producing a vacuum-insulated double container according to the first aspect, wherein the recrystallization includes heating the workpiece 3 in the vacuum heating furnace 6 and then rapidly cooling the workpiece in an atmospheric-pressure environment.

The third aspect relates to the method for producing a vacuum-insulated double container according to the second aspect, wherein the rapid cooling is a process including cooling the workpiece to normal temperature with nitrogen gas at a point in time at which the temperature inside the vacuum heating furnace 6 is about 700° C. or less.

The fourth aspect relates to a method for producing a vacuum-insulated double container according to the first aspect, wherein the workpiece 3 is heated to about 800° C. or greater, and the temperature is then lowered to induce recrystallization.

The fifth aspect relates to a method for producing a vacuum-insulated double container according to the second aspect, wherein the workpiece 3 is heated to about 800° C. or greater, and the temperature is then lowered to induce recrystallization.

The sixth aspect relates to a method for producing a vacuum-insulated double container according to the third aspect, wherein the workpiece 3 is heated to about 800° C. or greater, and the temperature is then lowered to induce recrystallization.

The seventh aspect relates to a method for producing a vacuum-insulated double container by placing a titanium internal cylinder 2 into a titanium external cylinder 1 via a space section S, and using the space section S between the external cylinder 1 and the internal cylinder 2 as a vacuum-insulating space section, the method comprising the steps of: degassing the space section S of a workpiece 3 that includes the pre-recrystallized external cylinder 1 and internal cylinder 2, and vacuum sealing a degassing hole while the workpiece 3 is heated in a vacuum heating furnace 6; and providing concavoconvex portions 4, 5 to a surface of the recrystallized external cylinder 1 and internal cylinder 2 by placing the workpiece 3 in an atmospheric-pressure environment.

The eighth aspect relates to a method for producing a vacuum-insulated double container according to the seventh aspect, wherein the recrystallization includes heating the workpiece 3 in the vacuum heating furnace 6 and then rapidly cooling the workpiece in an atmospheric-pressure environment.

The ninth aspect relates to a method for producing a vacuum-insulated double container according to the eighth aspect, wherein the rapid cooling is a process including cooling the workpiece to normal temperature with nitrogen gas at a point in time at which the temperature inside the vacuum heating furnace 6 is about 700° C. or less.

The tenth aspect relates to a method for producing a vacuum-insulated double container according to the seventh aspect, wherein the workpiece 3 is heated to about 800° C. or greater, and the temperature is then lowered to induce recrystallization.

The eleventh aspect relates to a method for producing a vacuum-insulated double container according to the eighth aspect, wherein the workpiece 3 is heated to about 800° C. or greater, and the temperature is then lowered to induce recrystallization.

The twelfth aspect relates to a method for producing a vacuum-insulated double container according to the ninth aspect, wherein the workpiece 3 is heated to about 800° C. or greater, and the temperature is then lowered to induce recrystallization.

The thirteenth aspect relates to a method for producing a vacuum-insulated double container by placing a titanium internal cylinder 2 into a titanium external cylinder 1 via a space section S, and using the space section S between the external cylinder 1 and the internal cylinder 2 as a vacuum-insulating space section, the method comprising the steps of: obtaining a recrystallized workpiece 3 that includes the external cylinder 1 and internal cylinder 2 by repeating a heating/cooling/normal pressure process of heating the workpiece 3 in a vacuum heating furnace 6 to a recrystallization temperature, cooling the workpiece, and placing the workpiece into an atmospheric-pressure environment a plurality of times to obtain the recrystallized workpiece 3; subsequently degassing the space section S of the recrystallized workpiece 3, and vacuum sealing a degassing hole while the workpiece 3 is heated in the vacuum heating furnace 6; and providing concavoconvex portions 4, 5 to a surface of the external cylinder 1 and the internal cylinder 2 by placing the workpiece 3 in an atmospheric-pressure environment.

The vacuum-insulated double container obtained according to the present invention, even though it is made of titanium, feels contoured to the touch because of the concavoconvex portions provided to the surface. Therefore, the vacuum-insulated double container has an extremely high quality of design similar to ceramics, and has the added value of no two containers being alike. Furthermore, the present invention is a breakthrough method for securely and efficiently producing vacuum-insulated double containers that allows such containers to be securely produced with high quality and diversity, so that no two containers are alike, due to the use of titanium recrystallization in the concavoconvex portions provided to the surface of the vacuum-insulated double container, and to obtain other remarkable and heretofore unobtainable operating effects.

DESCRIPTION OF THE PREFERRED EMBODIMENTS

Figure 1:
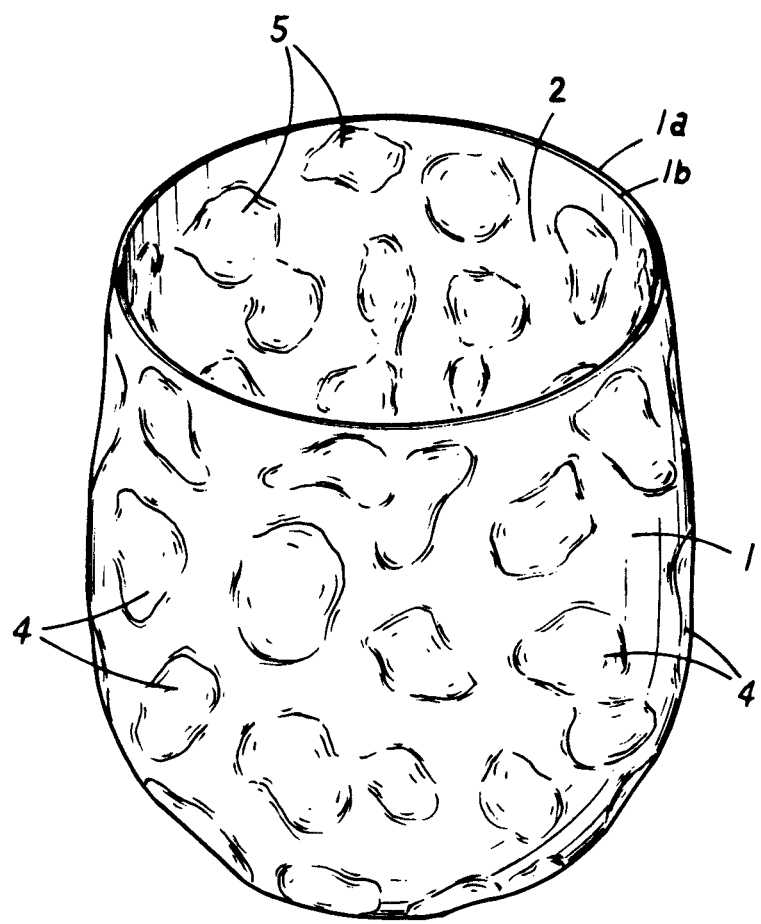
FIG. 1 shows a vacuum-insulated double container produced in accordance with the present example.

Preferred embodiments of the present invention are described in a simplified manner based on the drawings.

In the present invention, the space section S of a workpiece 3 is degassed and a degassing hole is vacuum sealed while the workpiece 3 having an external cylinder 1 and an internal cylinder 2 is heated in a vacuum heating furnace 6, and concavoconvex portions 4, 5 are then provided to the surface of the external cylinder 1 and internal cylinder 2 recrystallized by placing the workpiece 3 in an atmospheric-pressure environment.

That is, the concavoconvex portions 4, 5 are provided to the surface of the external cylinder 1 and the internal cylinder 2, whose ductility is increased due to recrystallization, by a process in which the titanium external cylinder 1 and the titanium internal cylinder 2 that constitute the workpiece 3 are heated in the vacuum heating furnace 6, the space section S between the external cylinder 1 and the internal cylinder 2 is used as a vacuum heating space section in the vacuum heating furnace 6, nitrogen is introduced, for example, into the vacuum heating furnace 6, and the workpiece 3 is placed in an atmospheric-pressure environment. The shape, number, and size of these concavoconvex portions 4, 5 vary depending on the workpiece 3 being processed.

Therefore, it is possible to obtain a container that, although made of titanium, has an extremely high quality of design similar to ceramics and has the added value of no two containers being alike because the container feels contoured to the touch due to the concavoconvex portions provided to the surface. It is also possible to securely and efficiently produce vacuum-insulated double containers that can be securely produced with high quality and diversity, so that no two containers are alike, due to the use of titanium recrystallization in the concavoconvex portions provided to the surface of the vacuum-insulated double container.

Furthermore, the concavoconvex portions 4, 5 are provided to the surface of the external cylinder 1 and internal cylinder 2 by degassing the space section S of the workpiece 3 and by vacuum sealing the degassing hole while heating the workpiece 3 having the pre-recrystallized external cylinder 1 and the internal cylinder 2 in the vacuum heating furnace 6, and then placing the workpiece 3 in an atmospheric-pressure environment.

More specifically, concavoconvex portions 4, 5 whose already high commercial value can be further improved can be provided, for example, by first heating the workpiece 3 to the titanium recrystallization temperature in a vacuum heating furnace 6 (heating may also be performed in a state in which the external cylinder 1 and the internal cylinder 2 have not yet formed the workpiece 3), then lowering the temperature to perform a pre-processing in which the external cylinder 1 and the internal cylinder 2 of the workpiece 3 are recrystallized, and subsequently performing a process in which the workpiece 3 recrystallized in advance by the pre-processing is heated and vacuum sealed in the vacuum heating furnace 6.

Performing the pre-processing in advance makes it possible to form larger, deeper, and more clearly defined concavoconvex portions 4, 5, compared with a case in which the workpiece 3 is heated and vacuum sealed without being pre-processed.

This is assumed to be due to the fact that ductility increases when the container is reheated after recrystallization.

EXAMPLES

A specific example of the present invention is described based on the drawings.

The present example describes a method for producing a vacuum-insulated double container by placing an internal cylinder 2 into an external cylinder 1 via a space section S, and using the space section S between the external cylinder 1 and the internal cylinder 2 as a vacuum-insulating space section. In the present example, the vacuum-insulated double container is configured as a tumbler used for drinking alcoholic beverages such as wine and whiskey, but this configuration is nonlimiting.

Figure 2:
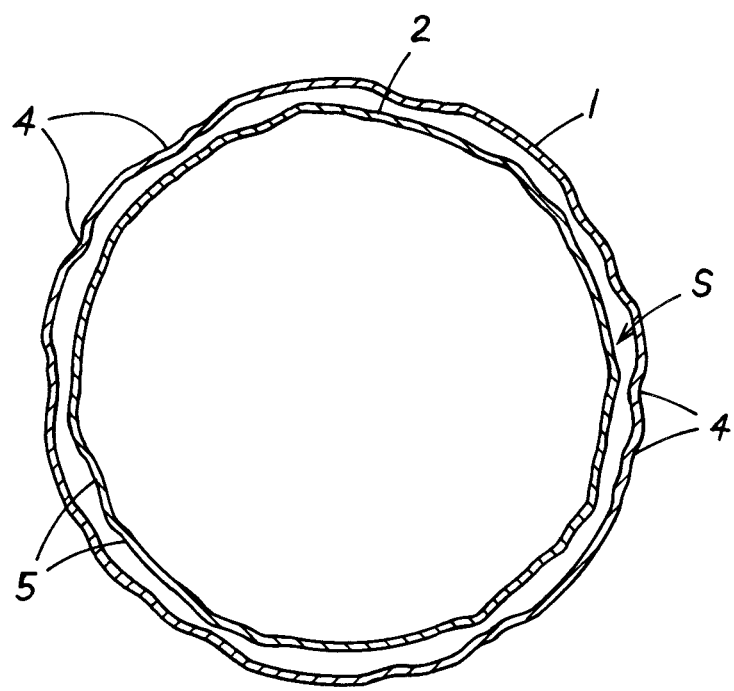
FIG. 2 is a horizontal sectional view of the vacuum-insulated double container produced according to the present example.
Figure 3:
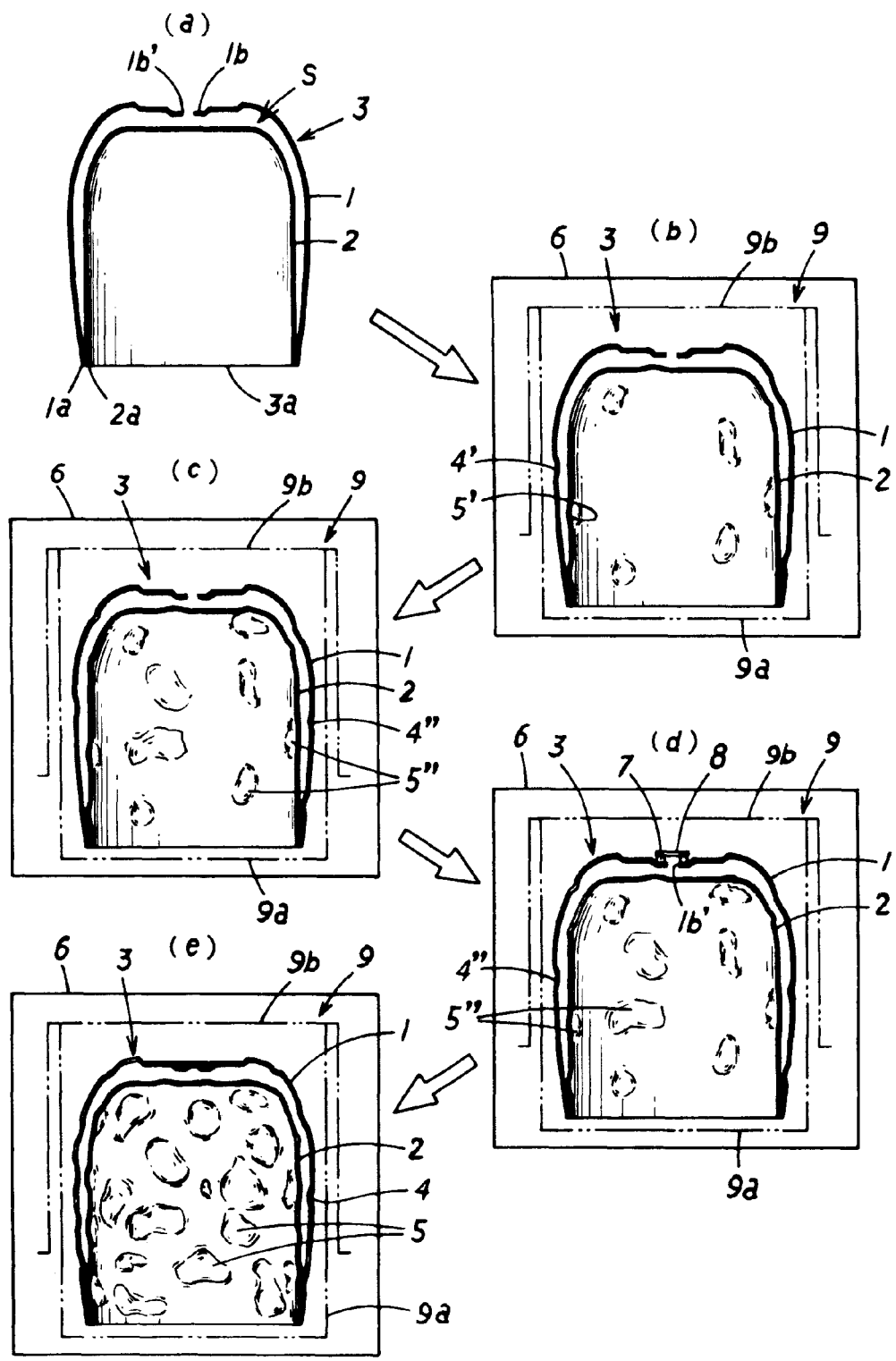
FIG. 3 is view depicting the steps for producing the vacuum-insulated double container according to the present example.

Furthermore, as shown in FIGS. 1 to 3, the external cylinder 1 and the internal cylinder 2 according to the present example are closed-end titanium cylinders, and the internal cylinder 2 is set to a smaller diameter and height than is the external cylinder 1. Furthermore, each of the openings 1a, 2a is set to substantially the same diameter.

Therefore, a space section is formed between the external cylinder 1 and the internal cylinder 2 when the internal cylinder 2 is placed in the external cylinder 1, and the openings 1a, 2a are joined to each other.

The "titanium" in the present specification refers to pure titanium or a titanium alloy. Furthermore, the material (components), plate thickness, and size (shape) of the external cylinder 1 and the internal cylinder 2 during production of the vacuum-insulated double container described below are appropriately selected with consideration for forming the concavoconvex portions 4, 5 in a way that does not adversely affect the functions of the vacuum-insulated double container (in particular, the insulation function).

Furthermore, a concave portion 1b is provided in the center bottom portion of the external cylinder 1, and a degassing hole 1b' is provided in the center position of the concave portion 1b during vacuum sealing.

Furthermore, as shown in FIG. 1, a very large number of concavoconvex portions 4, 5 is provided to the surface of the external cylinder 1 and the internal cylinder 2 during the production process described below.

Therefore, forming the concavoconvex portions 4, 5 provided to the surface of the vacuum-insulated double container having the external cylinder 1 and the internal cylinder 2 allows a design similar to ceramics to be obtained in a titanium container.

The method for producing a vacuum-insulated double container using the external cylinder 1 and internal cylinder 2 will now be described.

First, as shown in FIG. 3(a), the internal cylinder 2 is placed in the external cylinder 1, and the openings 1a, 2a are joined to each other by welding (argon welding) to form a workpiece 3. A space section S is formed between the external surfaces of the external cylinder 1 and the internal cylinder 2 constituting the workpiece 3. The space section S is vacuum processed later to form a vacuum-insulating space section.

A heating/cooling/normal pressure process in which the workpiece is first heated and then cooled is subsequently performed a plurality of times (two to three times).

Figure 4:
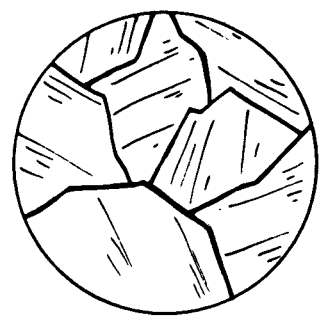
FIG. 4 is a partial enlarged view depicting the workpiece 3.

Specifically, as shown in FIG. 3(b), the workpiece 3 is placed in the vacuum heating furnace 6 so that the opening 3a faces downward, the interior of the vacuum heating furnace 6 is heated to about 800° C. or greater (from the titanium recrystallization temperature or greater to about 1,050° C., which exceeds the titanium transformation point of 880° C. (temperature at which the α structure changes to the β structure)), a vacuum ($10^{-3}$ to $10^{-4}$ torr) is established, and this state is maintained for 15 to 20 minutes. In the process, the external cylinder 1 and the internal cylinder 2 of the workpiece 3 recrystallize (form the α structure) and increase in ductility (the crystal grains in the non-recrystallizing portions coarsen, as shown in FIG. 4). Heating is then stopped, the container is allowed to cool naturally, normal pressure is restored at a point in time at which the temperature inside the vacuum heating furnace 6 reaches about 700° C. or less, nitrogen gas is introduced into the vacuum heating furnace 6, and the workpiece 3 is rapidly cooled by lowering the temperature to normal temperature in a single cycle. During the first cycle of the heating/cooling/normal pressure process, minute concavoconvex portions 4', 5' are formed on the external cylinder 1 and the internal cylinder 2.

The workpiece 3 that has undergone the first cycle of the heating/cooling/normal pressure process is subsequently subjected to the heating/cooling/normal pressure process again in the same manner as described above, as shown in FIG. 3(c). The concavoconvex portions 4'', 5'' are formed in a more complete manner on the external cylinder 1 and the internal cylinder 2 by the second cycle of the heating/cooling/normal pressure process.

Subsequently, after the second cycle of the heating/cooling/normal pressure process is completed, the space section S between the external cylinder 1 and the internal cylinder 2 is degassed, and the degassing hole 1b' is vacuum sealed.

Specifically, as shown in FIG. 3(d), the workpiece 3 is placed inside the vacuum heating furnace 6. Then a filler material 7 (titanium filler) is placed around the degassing hole 1b' provided to the bottom portion of the external cylinder 1, and a sealing plate 8 is placed on top of the filler material 7.

In this state, the temperature inside the vacuum heating furnace 6 is raised to about 800° C. or greater, degassing is gradually performed to a vacuum of $10^{-3}$ to $10^{-4}$ torr, and the temperature is raised further to about 1050° C.

In the process, the filler material 7 is melted to integrate the external cylinder 1 and the sealing plate 8 and to close the degassing hole 1b', and the space section S between the external cylinder 1 and the internal cylinder 2 is sealed while the vacuum state is maintained, forming a vacuum sealed space section.

Heating is stopped, nitrogen gas is introduced into the vacuum heating furnace 6 at a point in time at which the temperature inside the vacuum heating furnace 6 decreases by natural cooling to a temperature below 700° C. (about 630° C. to 670° C.), normal pressure is restored (the concavoconvex portions 4, 5 are formed at this time), the temperature is lowered to normal temperature in a single cycle, the workpiece 3 is cooled down, and the vacuum sealing operation is completed.

The reason that an atmospheric-pressure environment conditions are restored (nitrogen gas is introduced) at a temperature below 700° C. is to prevent a situation in which the material becomes too soft at about 700° C. or greater, and large convex portions occur on the external cylinder 1 and the internal cylinder 2 when the atmospheric-pressure environment (normal temperature) is restored in that state, forming sections where the external cylinder 1 and the internal cylinder 2 are in contact with each other. However, if the pressure is restored to normal pressure at a temperature that is too low, it becomes difficult for the concavoconvex portions to form, the process takes too much time, and productivity is low.

A very large number of large, clearly defined concavoconvex portions 4, 5 is formed on the surface of the external cylinder and the internal cylinder 2 (see FIG. 3(e)) in the vacuum heating furnace 6 where an atmospheric-pressure environment is maintained, and nitrogen is introduced to restore the environment to normal temperature and to fix the concavoconvex portions 4, 5.

The previously described heating/cooling/normal pressure process is performed inside the vacuum heating furnace 6 in order to inhibit the oxidation and nitriding (the container darkens, resulting in a marked drop in commercial value) that may occur during processing in an oxygen environment. Furthermore, the nitrogen gas is introduced into the vacuum heating furnace 6 at a point in time at which the temperature inside the vacuum heating furnace 6 is less than 700° C. in order to reduce the operating time, but also because nitriding readily occurs with nitrogen in the temperature range of about 800° C. or greater.

The processes described above can also be conducted with the workpiece 3 covered by the cover assembly 9 (a cover assembly 9 having a container 9a and a lid 9b) proposed by the applicant in U.S. Pat. No. 3,581,639, preventing the workpiece 3 from being oxidized or darkened by limiting contact with oxygen and nitrogen in the process.

Configuring the present example as described above makes it possible to obtain a vacuum-insulated double container that, even though it is made of titanium, has an extremely high quality (high decorative value) of design similar to ceramics due to a contoured feel produced by the concavoconvex feel resulting from the concavoconvex portions provided to the surface, and has the added value of no two containers being alike. Furthermore, due to the use of titanium recrystallization in the concavoconvex portions provided to the surface of the vacuum-insulated double container, the containers can be securely realized. It is also possible to securely and efficiently produce vacuum-insulated double containers to allow such containers to be securely produced with the aforementioned high quality and diversity, so that no two containers are alike, due to the use of titanium recrystallization in the concavoconvex portions provided to the surface of the vacuum-insulated double container.

Furthermore, heating the external cylinder 1 and the internal cylinder 2 of the workpiece 3 in accordance with the present example makes it possible to obtain a design (titanium crystal pattern) with a unique texture of large crystal grains, and to produce titanium crystal patterns having random sizes, shapes, configurations, and other features. This makes it possible to produce not only the previously described concavoconvex portions 4, 5, but also various patterns without much effort. Non-recrystallized portions form in the actual production process, and these portions appear as even more original patterns. Because the process of heating and returning to normal temperature in the present example is repeated a plurality of times, concavoconvex portions are formed in different areas each time, and original patterns can be formed thereby.

Furthermore, not only the external cylinder 1, but also the internal cylinder 2 is made of titanium in the present example, making it possible to produce a more luxurious feel by using an all-titanium construction.

The present invention is not limited to the present example, and the specific composition of each structural requirement can be appropriately designed.

What is claimed is:

1. A method for producing a vacuum-insulated double container by placing a titanium internal cylinder into a titanium external cylinder via a space section, and using the space section between the external cylinder and the internal cylinder as a vacuum-insulating space section, the method comprising the steps of:

heating and recrystallizing a workpiece that includes the external cylinder and internal cylinder in a vacuum heating furnace, degassing the space section of the workpiece and vacuum sealing a degassing, hole; and providing concavoconvex portions to a surface of the recrystallized external cylinder and internal cylinder by rapidly cooling the workpiece in an atmospheric-pressure environment.

2. The method for producing a vacuum-insulated double container according to claim 1, wherein the rapid cooling is a process including cooling the workpiece with nitrogen gas at a point in time at which the temperature inside the vacuum heating furnace is about 700° C. or less.

3. The method for producing a vacuum-insulated double container according to claim 2, wherein the workpiece is heated to about 800° C. or greater, and the temperature is then lowered to induce recrystallization.

4. The method for producing a vacuum-insulated double container according to claim 1, wherein the workpiece is heated to about 800° C. or greater, and the temperature is then lowered to induce recrystallization.

5. A method for producing a vacuum-insulated double container by placing a titanium internal cylinder into a titanium external cylinder via a space section, and using the space section between the external cylinder and the internal cylinder as a vacuum-insulating space section, the method comprising the steps of:

obtaining a recrystallized workpiece that includes the external cylinder and internal cylinder by repeating a heating/cooling/normal pressure process of heating the workpiece in a vacuum heating furnace to a recrystallization temperature, cooling the workpiece, and placing the workpiece into an atmospheric-pressure environment a plurality of times to obtain the recrystallized workpiece, wherein normal pressure is 1 atm;

subsequently degassing the space section of the recrystallized workpiece, and vacuum sealing a degassing hole while the workpiece is heated in the vacuum heating furnace; and providing concavoconvex portions to a surface of the external cylinder and the internal cylinder by placing the workpiece in an atmospheric-pressure environment.

* * * * *